Dec. 5, 1961     G. POTAPENKO     3,011,230
METHOD AND APPARATUS FOR THE STERILIZATION OF AIR
Filed Dec. 23, 1957     3 Sheets-Sheet 1

Gennady Potapenko,
*INVENTOR.*
BY.

*ATTORNEY.*

Dec. 5, 1961  G. POTAPENKO  3,011,230
METHOD AND APPARATUS FOR THE STERILIZATION OF AIR
Filed Dec. 23, 1957  3 Sheets-Sheet 2

Gennady Potapenko,
INVENTOR.

BY

ATTORNEY.

Dec. 5, 1961 G. POTAPENKO 3,011,230
METHOD AND APPARATUS FOR THE STERILIZATION OF AIR
Filed Dec. 23, 1957 3 Sheets-Sheet 3
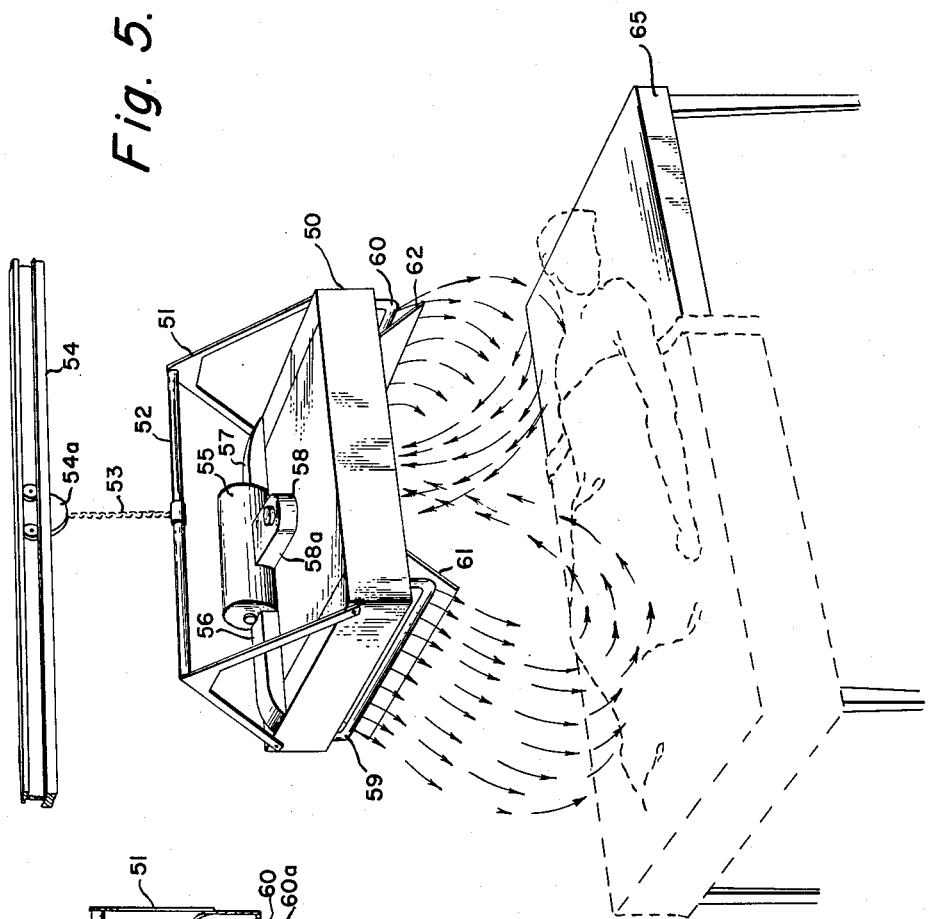
Gennady Potapenka,
INVENTOR.
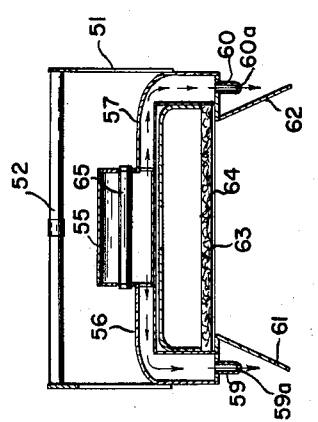
ATTORNEY

United States Patent Office 3,011,230
Patented Dec. 5, 1961

3,011,230
METHOD AND APPARATUS FOR THE STERILIZATION OF AIR
Gennady Potapenko, Pasadena, Calif., assignor to Reginald Robbins, Pacific Palisades, Calif.
Filed Dec. 23, 1957, Ser. No. 704,485
6 Claims. (Cl. 21—74)

The present invention relates to a method and apparatus for the sterilization of air and surfaces contacted thereby.

The invention is applicable to the use of any source or type of germicidal radiation, but, by way of example, the description which follows will be made with respect to the use of ultraviolet germicidal radition. Ultraviolet radiation of a wave length of 2,537 angstrom units, which can be generated by ultraviolet lamps and other sources, are commercially available. Such radition has been found to be highly effective in destrying or inactivating airborne bacteria and other micro-organisms. The practice of sterilization is effected by subjecting given surfaces, or the air in a room, to direct radiation from the source of ultraviolet light, as described for example in numerous publications among which may be mentioned "Ultraviolet Product Sanitation" and "Ultraviolet Air Sanitation," published by the Lamp Division of the General Electric Company, Cleveland, Ohio, as their pamphlets LD–14 of September 1953, and LD–11 of December 1953, respectively.

The use of direct ultraviolet radiation has been found to be undesirable for a number of reasons among which are the irritating effects of such radiation upon the skin and the eyes of persons upon which the radiation may fall. As a result of this, sterilization by ultraviolet radiation is carried out at present either by using the radiation when human beings are not present, or by directing the radiation toward the ceiling of the room, thus precluding a direct incidence of the light radiation upon human beings. The first of these methods is inconvenient, and the second is ineffective because it results primarily in the sterilization of the air in a small and relatively unimportant part of the room.

Applicant has now discovered that effective sterilization or removal of bacteria and other organisms from a given area or volume, whether in an enclosed chamber or in a larger enclosure or room, may be effectively carried out by combining the source of ultraviolet radiation or other germicidal means with filtering means, by circulating air to bring it repeatedly into contact with the germicidal means, and by adjusting the velocity of air flow through said filtering means in the manner described below.

The adjustment of said velocities of air flow must be carried out to satisfy two conflicting requirements: one is the need of having a relatively high air velocity, required to assure an adequate circulation of the air; another is the need of having a relatively low air velocity, required to assure effective retention of small particles by filtering means without creating an excessive pressure drop of air in such filtering means.

To satisfy these requirements, the invention provides for relatively high linear velocities of air flow at the outlet of the chamber containing the germicidal means, i.e., where the circulation originates, and a relatively low linear velocity of air at the intake and in front of said chamber where the filtering means is located.

Methods and apparatus of the type described have been found to be effective in sterilizing and purifying air in rooms, bird cages, laboratory hoods and enclosures, and similar enclosures of definite or restricted volume, as well as in providing sterile zones or regions within spaces of larger volume as in conjunction with tables in hospital operating rooms, or the like.

In accordance with the present invention, it has been found that the foregoing results may be obtained by directing the sterilized air along the opposite walls of a given room, bird cage, or other space of restricted volume, or by focusing sterilized air in a given pattern, as described below, onto or within a definite zone or region of limited extent, which zone is positioned within a larger enclosure or room and which it is desired to expose to the effects of sterile air.

To achieve the desired effects, the total cross-sectional area of the outlet orifices of the apparatus must be made much smaller than the cross-sectional area of the air intake of the apparatus in which the filter means is positioned. In the practice of the invention the cross-sectional area of the air intakes on which the filter means are positioned is made approximately ten times or more greater than the surface area of all the outlet orifices. If the ratio of these areas were made much smaller than ten, then the apparatus would not function effectively due to the fact that when said ratio is reduced by increasing the cross-sectional area of the outlet orifices, then the directive or focusing effect is decreased and the sterilization process becomes ineffective. When the opposite takes place, in other words when said ratio is reduced by decreasing the cross-sectional area of the air intake in which the filtering means is positioned, then the velocity of air flow through the filter is increased and the efficiency of the filter is decreased, as will be explained later. The use of relatively small air outlets in conjunction with relatively large air intake is considered to be an important aspect of the present invention. The volume of air in circulation must be kept in proportion to the size of the filter means; by way of example, it may be mentioned that in a space having a volume of 50 cubic feet, the flow of air of the order of three to five cubic feet per minute in combination with a filter pad of approximately five square feet of cross-sectional area is required to achieve proper circulation of air in an enclosure of said volume, which might be a bird cage or similar chamber. In using spaces of other volumes, the velocity of air and cross-sectional area of the filter is proportionately adjusted. Where a zone of limited extent must be sterilized within a large room, such as the region adjacent to or above the surface of an operating table in an operating room, the velocity of air flow may be increased two or more times in order to obtain a well-defined and predetermined sterile zone.

In the example given above, the linear velocity of air flow through the filter means is of the order of about one foot per minute, and such a small velocity is very important from the point of view of the efficiency of filtration. When the velocity of air flow through a filter is low, the filter member can retain particles which are smaller than the size of its pores, due to the fact that at a low velocity of flow the particles are able to adhere to the fibers of the filter and to be retained by the filter member. In general, the velocity of the sterilized air streams entering the zone to be sterilized should have a velocity of ten feet per minute or more, and the low velocity air stream being filtered should have a velocity of one foot per minute or less. The ability of the filter member to retain small particles could be increased by decreasing the size of the pores, but this is not desirable in the present case because it would incearse the pressure drop of the air across the filter member and this would require a great deal more power to drive the air through the filter. In the present invention, excellent retention of small particles of dust is achieved while using a filter having relatively large sized pores. The retention of small particles of dust by the filter member is of great importance in the present case because most of the bacteria which float in the air are attached to dust particles, and, the fewer dust particles found in the air entering the sterilization chamber, the more effective is the sterilization. Furthermore, if the dust particles are not effectively removed before the air enters the sterilizing chamber, they would settle upon the surface of the ultraviolet generator, thus decreasing its efficiency.

It is, therefore, an object of the present invention to provide a novel method and apparatus for sterilizing air and destroying air-borne bacteria within enclosures of restricted volume.

It is a further object of the present invention to provide a method and apparatus for the provision of sterile zones or regions of restricted volume within regions of greater volume.

It is an additional object of the present invention to provide effective means for sterilizing air and recirculating sterile air in such a manner that dust particles and air-borne bacteria are filtered effectively therefrom, while at the same time providing for controlled circulation of such air through zones of definite volume and dimensions.

Other objects will be apparent from a consideration of the specification and claims provided herewith and the accompanying drawings, wherein:

FIG. 5 is a view illustrating the application of the air sterilizing device in association with an operating table positioned in a surgical operatng room.

FIG. 6 is a view partly in vertical cross-section and partly in elevation taken along lines 6—6 of FIG. 5.

Figure 1:
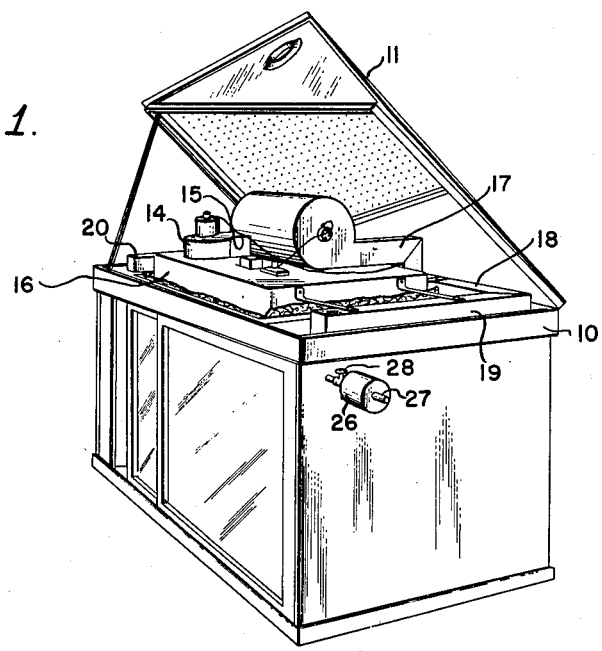
FIGURE 1 is a view of an air sterilizing apparatus associated with a chamber of restricted volume.
Figure 2:
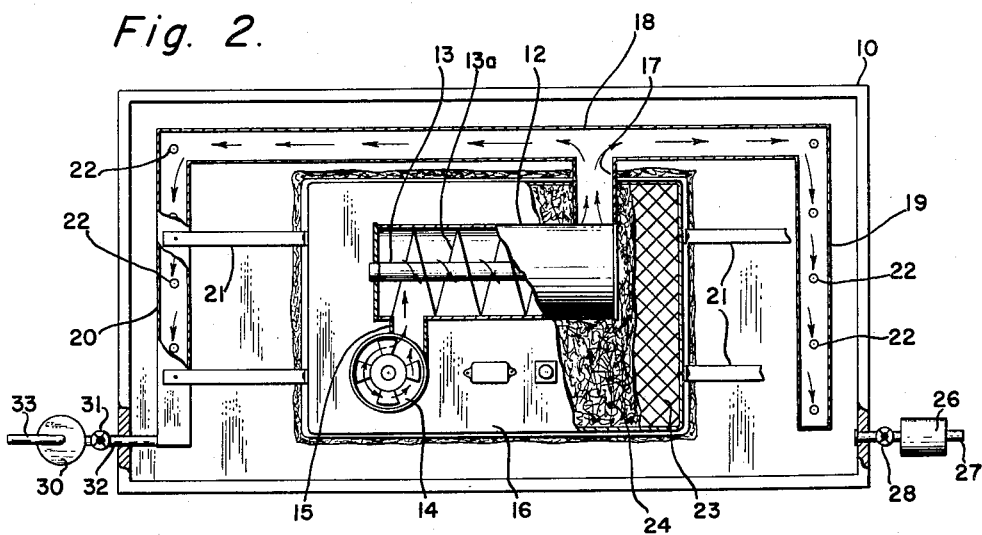
FIG. 2 is a top view partly in horizontal cross-section and partly in elevation illustrating the air sterilizing means and its circulation arrangement.
Figure 3:
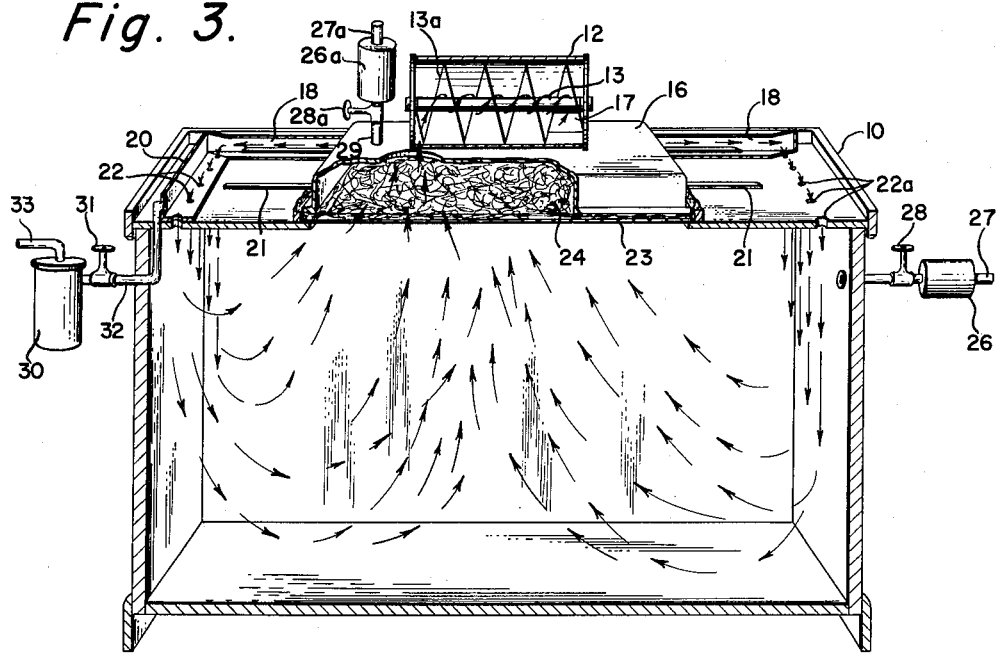
FIG. 3 is a view partly in perspective and partly in vertical cross-section further illustrating the air sterilizing device of the invention and its association with a chamber of restricted volume as illustrated in FIGS. 1 and 2.

As shown in the drawings, FIGS. 1 to 3, inclusive, illustrate the invention as applied to the sterilization of air within a chamber of restricted volume, such as would be used in a bird or animal cage. As illustrated in FIGS. 1 to 3, a chamber or cage 10 is provided with a cover or top enclosure 11, the air sterilizing unit being positioned on the top of the chamber and protected or concealed by said enclosure. The air sterilizing unit itself is composed of a cylindrical housing 12 within which an ultraviolet air sterilizing lamp 13 is positioned in an axial concentric manner. A helical baffle 13a is positioned within the housing 12. This baffle consists of a strip of sheet metal which is bent in a helical pattern and is attached to the interior surface of the housing by welding, or the like. The width of the strip is somewhat less than the width of the space between the tube and housing to provide a space for positioning the tube. The baffle may be omitted if desired, but is preferable since it ensures the provision of a helical air path. Air drawn from within the enclosure is circulated through the radiation housing by means of a motor driven air pump or turbine 14 through air inlet duct 15 which is positioned tangentially with respect to the radiation housing. The air pump with its attached motor and the radiation housing are positioned or mounted upon a filter chamber 16 which is positioned over and encloses the air filter, as referred to below. The air that is circulated through the radiation chamber is driven therethrough in a tangential manner, as illustrated by the arrows in FIGS. 2 and 3, and leaves the housing by means of an outlet duct 17 which communicates with a manifold conduit 18 which, in turn, communicates with ducts 19 and 20. These ducts are positioned above and in alignment with the side walls of the chamber and are provided with spacing and reinforcing brackets 21, as shown. Ducts 19 and 20 are also provided with orifices or restricted openings 22 which communicate with the chamber and are designed to direct streams of sterilized air downward and adjacent to the side walls of the chamber. The roof of the chamber is provided with an opening over which is positioned a filter support screen 23 which provides support for a filter member or filter pad 24. One side wall of the chamber is provided with a conduit 27 connected to a filter element 26 communicating with a valve means 28. The other side wall of the chamber is provided with a trap 30 provided with a conduit 32 communicating with duct 20 through tube 32a and controlled by a valve means 31. Conduit 27a is provided with a filter element 26a communicating with a valve means 28a, and a conduit 29 communicating with the filter chamber 16, as shown in FIG. 3.

Valve 28a, when opened, admits a small volume of fresh air from the outside of the enclosure into the filter chamber 16 and from there through the sterilizing chamber 12 into the enclosure.

Valve 31, when opened, allows a small volume of sterilized air to escape from the duct 20, and, therefore, from the enclosure.

Now, therefore, when valves 28 and 28a are opened, while valve 31 is closed, a small volume of fresh air will be entering the enclosure through valve 28a, and the same volume of sterilized stale air will be escaping through valve 28. In this way, a well controlled circulation of fresh air through the enclosure can be established. Such circulation is needed when the enclosure is used as a bird cage, or as a cage for test animals, such as guinea pigs.

When valves 28 and 31 are opened, while valve 28a is closed, then a small volume of fresh air will be entering the enclosure through valve 28, while the same volume of stale air will be escaping through valve 31. This type of circulation is preferred in cases when the enclosure is used for work with virulent micro-organisms, because it results in a slightly lowered air pressure inside of the enclosure and, as a result of this, it eliminates the chances of air escaping from the enclosure through cracks and fissures on the walls, thus minimizing the danger of contaminating the air outside of enclosure. In such case, however, trap 30 is connected to valve 31 and filled with a germicidal solution through which the escaping air passes and becomes sterilized, leaving via line 33.

As shown in FIG. 3, the operation of the device and the flow of air therethrough is illustrated by the arrows representing air currents flowing through the respective portions of the apparatus, which are cut away for purposes of illustration. As illustrated, air at a relatively low velocity is drawn through the filter pad and is pumped through the radiation chamber, thence through the manifold and the ducts, downwardly through the side orifices, with the air sterilized in the radiation chamber flowing downward at a relatively higher velocity, thus establishing the circulation of air in the whole cage. When such a chamber is utilized, as a bird cage or the like, means for the ingress of fresh air through openings at the bottom or sides of the chamber are provided. This fresh air is diluted with the sterilized air and is itself sterilized on recirculation. Preferably, the air inlet may be in the housing which supports the air sterilizing unit so that the fresh air is itself sterilized before being introduced into the chamber proper.

Figure 4:
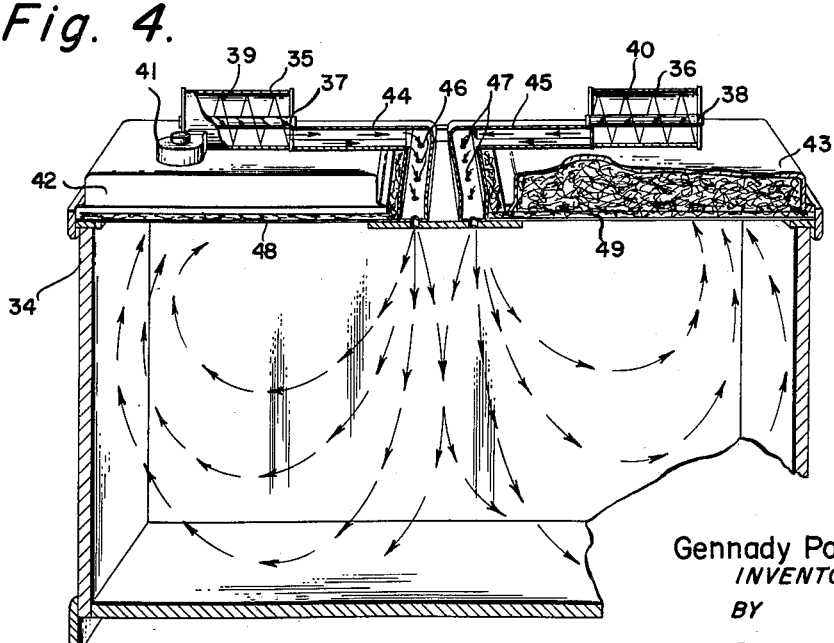
FIG. 4 is a view partly in vertical cross-section illustrating a modified form of the invention.

In the modified form of the invention illustrated in FIG. 4, chamber 34 is provided with means for circulating air in a direction opposite to that described in FIGS. 1 to 3 but with the same objectives and results. This is accomplished by circulating the sterilized air downwardly along a median plane of the chamber and drawing it upwardly at opposite sides through filters at a reduced velocity. This may be accomplished by using a single air sterilizer and circulating the sterilized air downward through the center of the chamber and drawing the air back to the sterilizer through a pair of filters, one on each side of the chamber. However, one simple manner for accomplishing this purpose is, as illustrated in FIG. 4, by the use of two separate units comprising separate sterilizing chambers 35 and 36, comprising tubes 37 and 38, and baffles 39 and 40. Air pump, or turbine, 41 is provided, and a similar unit (not shown) is provided for the other side. Each unit is provided with housings 42 and 43, respectively provided with ducts 44 and 45 and inlet openings to the chamber 46 and 47. Each chamber is provided with a filter unit shown at 48 and 49. Air circulation is indicated by the arrows and extends downwardly through the central portion of the chamber and upwardly adjacent the walls before being drawn through the respective filters and sterilizing units for recirculation.

Still another form of the invention is illustrated in FIGS. 5 and 6. In this modification the invention is applied within an operating room, the objective being to sterilize the air within a given zone above and adjacent to the surface of the operating table for the purpose of sterilizing the air in the operating zone and preventing access of air-borne bacteria to said zone. As shown in these figures, enclosure 50 is supported by a frame member 51 by means of chain or other means 53 attached to cross arm 52. The chain is supported on wheels or rollers mounted on a track 54 for lateral movement of the unit, while vertical adjustment may be made by raising or lowering the unit on pulley 54a. The sterilizing and circulating unit mounted in and upon enclosure 50 comprises a sterilizing chamber 55 containing ultraviolet tube 65, communicating with outlet ducts 56 and 57 and provided with air inlet duct 58a leading to blower or air turbine 58. The outlet ducts 56 and 57 communicate with conduits 59 and 60, respectively, which are perforated at 59a and 60a to provide jets or streams of sterilized air. The sterilized air from the sterilization chamber is projected downward and circulates in the manner illustrated by the arrows in FIG. 5, being drawn upward and inward through filter member 63 positioned on screen 64. In order to ensure a suitable pattern of air flow and to minimize direct circulation from the conduits 59 and 60 to the filter, baffles 61 and 62 are provided which may be positioned in such a manner that the angle of deflection may be adjusted to provide the desired pattern. As illustrated, a patient to be operated upon is positioned on table 65 with the operative zone protected against bacterial contamination, as described above. The circulation of sterilized air in the zone above and surrounding the patient serves to provide a protective, substantially germ-free barrier preventing access of air-borne bacteria and transporting such bacteria as may be present in the zone through the sterilizing unit and filter.

Although certain preferred embodiments of my invention have been described above, it will be obvious to those skilled in the art that various changes and modifications may be made therein without departing from the true spirit and scope of the invention as covered by the appended claims.

I claim:

1. An apparatus having an air inlet and an air outlet for producing a sterile zone, said apparatus comprising a separate enclosed chamber containing a source of germicidal ultra violet radiation, said chamber completely containing said source of radiation to prevent the entry of direct and reflected radiation therefrom outward and into said zone to be sterilized, a blower for circulating air through said chamber, duct means for directing said sterilized air in a plurality of streams of relatively high velocity spaced to define said zone, and a filter member adjacent said chamber, said blower being adapted to withdraw said air from said zone at relatively low velocity through said filter member and to recirculate said air through said chamber, said duct means and said filter member, said relatively low and high velocities being obtained by having the cross-sectional area of said air inlet at least approximately ten times greater than the cross-sectional area of said air outlet.

2. Apparatus having an air inlet and an air outlet for the provision of a sterile air zone within a larger space, said apparatus comprising an air sterilizing chamber including a source of germicidal ultra violet radiation in a separate enclosure, said source of radiation being disposed within said separate enclosure to prevent the entry of direct and reflected radiation therefrom outward and into said space or said zone, a duct for directing said sterilized air downwardly in a plurality of streams of relatively high velocity air along the boundaries of a predetermined zone, filter means adjacent said chamber, blower means for withdrawing air at relatively low velocity through said filter means and from said air zone and for recirculating said withdrawn air through said sterilizing chamber and returning it to said predetermined zone, said relatively low and high velocities being obtained by having the cross-sectional area of said air inlet at least approximately ten times greater than the cross-sectional area of said air outlet.

3. A method for the sterilization of air which comprises continuously circulating such air in a baffled helical path surrounding a longitudinally extending source of germicidal ultra violet radiation within a separate enclosed sterilizing chamber of restricted volume, providing said source of radiation in said enclosed chamber to prevent the entry of direct and reflected radiation therefrom into a space which is to receive sterile air, and drawing air into said chamber at a relatively low velocity through an air inlet having a first predetermined cross-sectional area and directing sterilized air from said chamber at a relatively high velocity through an air outlet having a second predetermined cross-sectional area, said first area being at least approximately ten times greater than said second area to produce said low and high velocities.

4. The method for the provision of a sterile air zone within a larger space which comprises sterilizing air by contact with germicidal ultra violet radiation in a separate enclosed chamber while avoiding direction or reflection of such radiation into said space, directing said sterilized air into said larger space through an air outlet having a first predetermined cross-sectional area at a relatively high velocity and in a confined manner to define the bounds of said zone, withdrawing air from said zone through an air inlet having a second predetermined cross-sectional area at a relatively low velocity, said second area being at least approximately ten times greater than said first area to produce said low and high velocities, and continuously recirculating and sterilizing said air.

5. Apparatus for producing a zone of sterile air which comprises a separate enclosed chamber, said chamber surrounding said source of radiation to prevent the entry of direct and reflected radiation therefrom into said zone, a tubular source of germicidal ultra violet radiation positioned therein, a helical baffle surrounding said tubular source of radiation, a blower for directing air to be sterilized along the surface of said baffle in a helical path around said tubular member, and a duct having an air outlet of a first predetermined cross-sectional area for directing said sterilized air in a plurality of spaced paths and at a relatively high velocity and defining a sterile zone, said blower being adapted for withdrawing air from said zone through an air inlet of a second predetermined cross-sectional area at a relatively low velocity and for recirculating said air through said chamber and around said baffle, said second area being at least approximately ten times greater than said first area to produce said low and high velocities.

6. A method for the circulation of sterilized air within an enclosure which comprises continuously circulating the air within said enclosure in a helical path through a separate enclosed chamber containing a source of germicidal ultra violet rediation while avoiding incidence of direct or reflected radiation into said enclosure, drawing air into said chamber at a relatively low velocity through an air inlet having a first predetermined cross-sectional area and directing sterilized air from said chamber at a relatively high velocity through an air outlet having a second predetermined cross-sectional area, said first area being at least approximately ten times greater than said second area to produce said low and high velocities, introducing a controlled amount of fresh unsterilized air into said chamber to be sterilized before circulation through said enclosure, and withdrawing a controlled amount of stale air from said enclosure to the exterior thereof.

References Cited in the file of this patent

UNITED STATES PATENTS

| | | |
|---|---|---|
| 2,087,436 | Kirby | July 20, 1937 |
| 2,198,867 | Fair | Apr. 30, 1940 |
| 2,335,056 | Grison | Nov. 23, 1943 |
| 2,398,627 | Disbro | Apr. 16, 1946 |
| 2,472,243 | Berryman | June 7, 1949 |
| 2,638,644 | Rauhut | May 19, 1953 |
| 2,747,101 | Hammond | May 22, 1956 |

FOREIGN PATENTS

| | | |
|---|---|---|
| 8,300 | Great Britain | 1909 |